United States Patent [19]

Coderre

[11] 4,441,827
[45] Apr. 10, 1984

[54] TRAVELLING SURFACE TEMPERATURE PROBE

[76] Inventor: André Coderre, 15964 Perreault St., Pierrefonds, Quebec H9H 1N3, Canada

[21] Appl. No.: 196,535

[22] Filed: Oct. 14, 1980

[51] Int. Cl.³ .................. G01K 13/08; G01K 1/14
[52] U.S. Cl. .................................. 374/153; 374/163
[58] Field of Search ........................ 73/351, 362.8

[56] References Cited

U.S. PATENT DOCUMENTS

| | | | |
|---|---|---|---|
| 2,302,640 | 11/1942 | Schmidt | 73/374 |
| 2,991,654 | 7/1961 | Engelhard | 73/351 X |
| 3,279,956 | 10/1966 | Ekstrom, Jr. | 73/351 X |
| 3,295,842 | 1/1967 | Stelling, Jr. et al. | 73/351 X |
| 3,715,923 | 2/1973 | Hornbaker et al. | 73/359 X |
| 3,875,799 | 4/1975 | Webster | 73/362.8 X |
| 3,934,477 | 1/1976 | Thettu | 73/351 X |
| 4,091,673 | 5/1978 | Tamura | 73/351 |

FOREIGN PATENT DOCUMENTS

| | | | |
|---|---|---|---|
| 670519 | 4/1952 | United Kingdom | 73/351 |
| 1178139 | 1/1970 | United Kingdom | 73/351 |

OTHER PUBLICATIONS

Publication "The Teflon Story" Dupont Plastic Bulletin, vol. 12, 1950, pp. 183–186.

*Primary Examiner*—Daniel M. Yasich

[57] ABSTRACT

A temperature probe having a sensor mounted on a flexible sheet having a low coefficient of friction surface that contacts the surface to be sensed and a coefficient of conductivity to permit rapid transmission of heat through said flexible sheet to a sensor mounted on the side of the flexible sheet remote from the contact surface, the flexible sheet being formed into a configuration to permit same to flex when contacting the surface to be sensed and thereby tend to conform to the shape of the surface being sensed.

5 Claims, 2 Drawing Figures

TETRAFLUOROETHYLENE

TETRAFLUOROETHYLENE

TRAVELLING SURFACE TEMPERATURE PROBE

FIELD OF INVENTION

The present invention relates to a temperature probe. More specifically the present invention relates to a temperature sensor adapted to contact a travelling surface such as a dryer drum surface, felt or paper web and accurately indicate the temperature of this surface.

DESCRIPTION OF THE PRIOR ART

There are various devices available on the market to sense the surface temperature of travelling surfaces such as dryer drums. Most of these are not satisfactory for one reason or another. Probably the most predominent reason being the required time to obtain an accurate reading and in many cases the accuracy of the readings is questionable i.e. the readings are affected significantly by inputs other than the temperature of the surface to be sensed.

It has been found that with some equipment the time delay required to obtain a reading is governed by the required time for the body of the sensor to equilibriate with the temperature of the surface being sensed and that this time factor is quite significant (in the order of minutes) Obviously, if the sensor must contact the surface for a period of time, friction will be generated between the surface and the sensor and this, if significant, will further affect the results obtainable.

In some of the currently available sensors a preset air gap is provided between the surface being sensed and the sensor element thereby to reduce the amount of friction between the surface and sensor in an attempt to overcome the distortion in readings due to heat generated by friction. However, the air space also acts as an insulator increasing significantly the time required to obtain an accurate reading.

BRIEF DESCRIPTION OF THE INVENTION

It is an object of the present invention to provide a new temperature sensor for contacting a travelling surface and to provide relatively quickly an accurate reading of the surface temperature.

Broadly, the present invention relates to a temperature probe for sensing the temperature of a travelling surface, comprising a mounting means, a mounting member mounted from said mounting means, said member comprising a thin flexible sheet member having an inside and an outside surface, said outside surface forming a contact surface of low coefficient of friction adapted to contact said travelling surface over an area of said contact surface a sensor element mounted on the inside surface in an area opposite said contact area, said mounting means mounting said member from a location spaced from said sensor, the coefficient of friction between said contact surface and said travelling surface, the thickness and thermal conductivity of said member being coordinated so that heat generated by contact between said member and said travelling surface does not materially affect the temperature of said sensor element and that a temperature deferential of up to 20° F. in the temperature of said travelling surface is detected by said sensor element in less than 30 seconds.

In the preferred embodiment the low coefficient of friction sheet member is formed of Teflon, is bent into a U-shaped and is supported by arms of the U with the sensor element mounted in the center of a bridging section connecting the arms of the U. Preferably, a pair of rigid legs will extend substantially parallel to and adjacent to the arms of the U-shaped member to limit the amount of deflection on the U-shaped member.

BRIEF DESCRIPTION OF THE DRAWINGS

Futher features, objects and advantages will be evident from the following detailed description of the preferred embodiments of the present invention taken in conjunction with the accompanying drawings in which.

DESCRIPTION OF THE PREFERRED EMBODIMENTS

Figure 1:
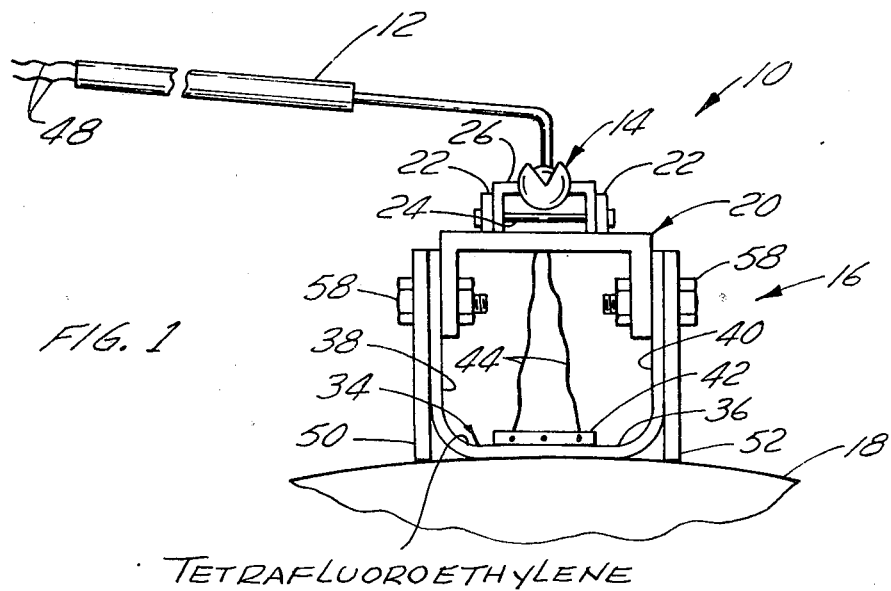
FIG. 1 is a side elevation schematically illustrating the sensor probe in contact with a drum surface.

Generally, the sensor 10 will be mounted at the end of an extendable arm 12 via some form of universal joint coupling 14 so that the sensor head 16 can be moved into position against the surface to be sensed such as the drum surface 18 shown in FIG. 1. The universal joint type coupling 14 permits the sensor headed to be self-orienting when it contacts the surface such as surface 18.

Figure 2:
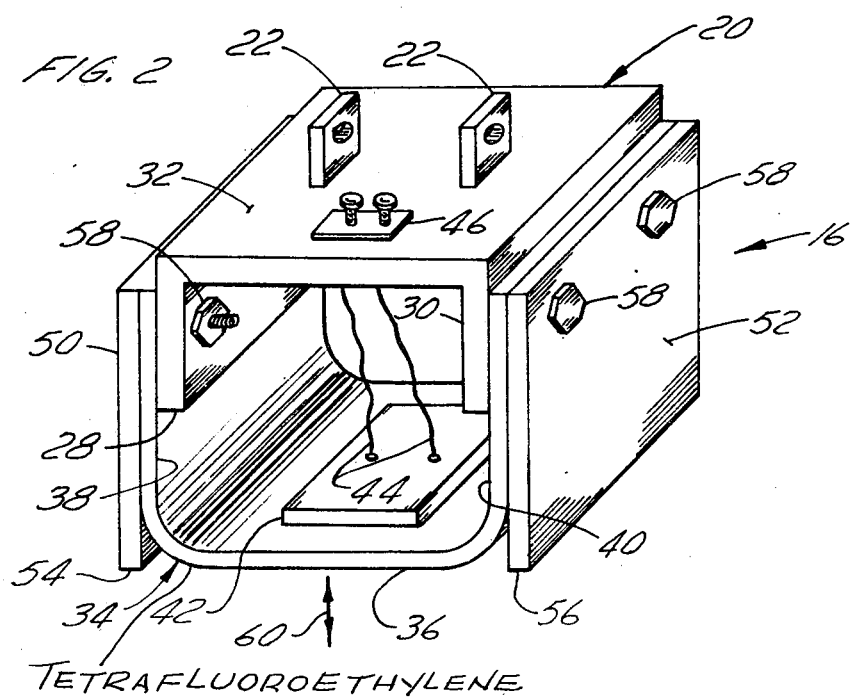
FIG. 2 is an isometric schematic illustration of the sensor head.

In the specific arrangement illustrated, the sensor head 16 as shown in FIGS. 1 and 2 comprises a support member 20 mounted directly to the universal joint coupling 14 via, in the illustrated arrangement, a pair of flanges 22 through which pass a shaft 24 which connects member 20 to the remainder 26 of the universal joint connection.

As illustrated, the member 20 is provided with a pair of mounting faces 28 and 30 interconnected by bridging member 32 from which the mounting flanges 22 project.

A low coefficient of friction, thin, flexible sheet 34 is formed into a U-shaped configuration having a bridging section generally indicated at 36 interconnecting a pair of arms 38 and 40. The arms 38 and 40 are secured to the faces 28 and 30 respectively of the member 20 so that the bridging members 32 and 36 are preferrably substantially parallel.

Preferably, the U-shaped member 34 will be formed from a thin Teflon sheet so that it may be deflected easily and thereby, under light pressure will tend to conform to the surface being sensed, i.e. if a drum surface is being sensed the bridging section 36 will conform to the surface of the drum i.e. a segment of a circular cylinder.

Located on the inside surface about the midpoint of the bridging section 36 of the U-shaped member 34 is a temperature sensitive element 42 which is connected by flexible electrical leads 44 to a suitable terminal or the like 46 which in turn are connected via the lines 48 at the end of the handle section 12 in FIG. 1 to a suitable temperature indicating mechanism. preferably the sensor element will not extend the full length of the section 36 and will be spaced from and centered between the arms 38 and 40.

The actual sensor element 42 used may be any suitable temperature sensing means such as a thermo-couple or preferrably a temperature transducer element such as the one available under the trade name Swema from Noram Quality Control and Research Equipment Limited, Montreal, Quebec, Canada.

In the preferred arrangement a pair of protecting legs 50 and 52 which form means for limiting the pressure applied by member 34 against the surface to be sensed are mounted on the outside of each of the arms 38 and 40 respectively of the flexible member 34. The free end edges 54 and 56 of these legs 50 and 52 preferably are in the plane of the bridging section 36 and limit the amount of pressure that may be applied to or by the flexible member 34. If the sensor is pushed too hard against the surface to be sensed the member 34 particularly the bridging section 36 may be deflected too much and bow away from the surface 18 to be sensed thereby significantly effecting contact between member 34 and the surface 18 and the transmission of heat to the element 42 thereby to distort the reading. Also if too much pressure is applied heat may be generated and further affect the reading. Obviously, if sufficient care is taken in applying the sensor to the surface the legs 50 and 52 are not needed.

As illustrated the members 20 and 34 are held together by a suitable bolts or the like schematically indicated at 58. These bolts also function to hold the legs 50 and 52 in position as illustrated.

In operation, the temperature sensing probe 10 is manipulated by the handle 12 to position the sensing head 16 in contact with the surface such as the surface 18 and rest the bridging section 36 of the flexible member 34 in contact with the surface to be sensed. This brings the sensor element 42 into close proximity to the surface 18. It will be apparent that the thickness of the flexible member 34 should be such as to permit flexing of the member so that it may move as indicated by the arrow 60 and conform with the surface 18 so that there will be good contact between the flexible member particularly the section 36 and the surface 18 being sensed thereby facilitating the transfer of heat through the flexible member 34 to the sensor 42. Obviously, if the surface to be sensed is planer, the member 34 need only be flat and preferably be resiliently supported. The flexible member 34 must also be a relatively good conductor and not significantly impede the transfer of heat through the flexible member 34 to the sensor element 42. Furthermore the contact surface of the member 34 must have a coefficient of friction to insure a significant amount of heat is not generated via contact with the surface being sensed under the conditions of application of the sensor to the surface (low pressure and low coefficient of friction).

As above indicated, the flexible member 34 must be flexible (spring-like), have a low coefficient of friction to prevent generation of sufficient heat to distort significantly the temperature reading under normal conditions of operation and be able to conduct heat to and from the sensor relatively quickly provide an indication of a change in temperature. Obviously, the material need not so conductive as to indicate a change in temperature of say 200°–300° F. substantially instantaneously. However, with temperature changes of less than about 20° F. the change should be relatively quickly in the order of less than 30 seconds and preferably less than 10 seconds for a 10° F. temperature differential (i.e. the thickness of the member 34 when Teflon is used will be between about 15 and 20 mills). Thus, for sensing the temperature, say a dryer roll at say 270° F. for the initial reading the probe is placed in contact with the dryer surface for a period of time to bring the probe sensor element to dryer temperature, generally in the order of less than about 3 minutes. Thereafter, the temperature profile of the roll i.e. temperature at space locations axially of the roll can be obtained by appropriately positioning the probe and maintaining it in the given position for a period of less than about 10 seconds to permit the sensor element to achieve the same temperature as the surface being sensed, in this example, the drum surface. Teflon (registered trademark of Du Pont Company for tetrafluoroethylene resin) sheet material has been found to be an excellent material for forming the flexible member 34. In specific examples, Teflon sheets about 3 inches wide and between 15–20 mill thickness have been used quite satisfactorily on a sensor unit having a bridging section 34 with about 2½ inches spacing between the arms 38 and 40 and with the bridging section 36 spaced from the member 20 by a distance of ¾ to ⅞ inches.

Other material, having similar properties may be used provided the coefficient of friction, thickness and thermal-conductivity are properly coordinated.

A material that will not generate significant heat, under the contact pressure, to significantly effect the temperature reading under the operating conditions of the sensor will have satisfactory coefficient of friction and the term "low coefficient friction" is intended to define such material in the disclosure and claims.

Also the material must have a high thermoconductivity. The value given for Teflon (polytetrafluoroethylene) is about 0.14 BTU/hour/square foot/ degree °F./foot. But a suitable material that will transmit the heat of the surface to the element through the required thickness of the material in the time required for a reading will possess the required degree of thermal conductivity.

Obviously, the material selected must be suitable for use and maintaining its require degree of structural integrity and resiliancy at the temperatures to be sensed.

Clearly the length L as determined by the distance between the bottom edges of the member 20 and the inner surface of the section 36 of the flexible member 34 (See FIG. 2) will be sufficiently long to provide a space isolating the sensor 42 from the member 20. This length determines the length of the arms 38 and 40 which in part determines the conformability of the member 34 in the bridging section 36.

While the flexible member has been illustrated as substantially U-shaped in configuration it will be apparent that other shapes may be used, for example, the flexible member 34 could be circular with one side of the circle being connected to the universal mounting 14 and the temperature sensor mounted on the inside of the circle on the side of the circle remote from the universal mounting. Alternatively, the member 34 could be a segment of a cylinder or elliptual section or the like extending between a pair of spaced mounting surfaces or arms if sufficiently stiff or could be mounted only at one end with the sensor 42 mounted adjacent the other end cantaliver fashion however insinuing proper positioning of the sensor element density opposite the contact area may be difficult.

As above indicated in operation the head 16 is simply moved into contact with the surface 18 to be sensed and the bridging section 36 tends to conform to the surface so that the sensor is close to the surface 18 and can sense the temperature of this surface. The temperature is read on a suitable instrument (not shown) and the head moved away.

To determine the accuracy the sensor constructed in accordance with the present invention, a sensor having a thermo-couple as the sensing element was used in the static condition and in the dynamic condition to sense the temperature of a roll. The sensor registered 248° F. in both conditions. A similar test was performed between a moving surface and a sensor incorporating the Swema element described hereinabove and another using the thermo-couple and again the temperatures sensed were identical.

When a similar test using the Swema sensing element on a commercial mounting of the prior art was used it was found that the temperature varied significantly over time and that the temperature sensed never accurately correlated with the temperature of the travelling surface (in the commercial unit the element was mounted with an air space between the sensing element and the surface).

Modifications may be made without departing from the spirit of the invention as defined in the appended claims.

I claim:

1. A temperature probe adapted to sense the temperature of a surface travelling relative to said probe comprising; a support member having a pair of spaced apart arms, a bridging section formed from flexible sheet material mounted from said arms and bridging across the space between said arms and having a contact face adapted to contact said surface being sensed over a contacting portion of its area and an opposite face facing the space between said arms, said contacting portion being spaced from said arms, a sensor element in said space between said arms in close thermal contact with said opposite face in an area of said opposite face directly opposite said contacting portion; said sensor element being spaced from said support member, said flexible sheet material having a low coefficient of friction between said contacting portion and said surface travelling relative to said probe and a thickness and a thermal conductivity coordinated so that heat generated by contact between said sheet material and said surface does not materially affect the temperature of said sensor element and a temperature differential of up to 20° F. on said surface is detectable by said sensor element in less than 30 seconds.

2. A temperature probe as defined in claim 1 wherein said temperature differential is up to 10° F. and is detectible by said sensor element in less than 10 seconds.

3. A temperature probe as defined in claim 1 or 2 wherein said flexible sheet material is polytetraflyoroethylene.

4. A temperature probe as defined in claim 1, 2 or 3 further comprising protective legs limiting the movement of said sensor toward said surface to be sensed, said protective legs comprising relatively rigid means projecting from said support member on the outside of said arms on opposite sides of said bridging section of said flexible sheet material in a position to contact said surface to limit pressure between said bridging section and said surface.

5. A temperature probe as defined in claims 1, 2 or 3 wherein ends of said flexible sheet material on opposite sides of said bridging section are secured to outer surfaces of said arms on said support member.

* * * * *